US009952676B2

(12) United States Patent
Camacho Perez et al.

(10) Patent No.: US 9,952,676 B2
(45) Date of Patent: Apr. 24, 2018

(54) WEARABLE DEVICE WITH GESTURE RECOGNITION MECHANISM

(71) Applicant: Intel Corporation, Santa Clara, CA (US)

(72) Inventors: Jose Rodrigo Camacho Perez, Guadalajara Jalisco (MX); Hector Alfonso Cordourier Maruri, Guadalajara (MX); Hector Raul Moncada Gonzalez, Guadalajara (MX); Julio Cesar Zamora Esquivel, Zapopan (MX); Paulo Lopez Meyer, Tlaquepaque (MX); Alejandro Ibarra Von Borstel, Zapopan (MX)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/749,960

(22) Filed: Jun. 25, 2015

(65) Prior Publication Data

US 2016/0378193 A1 Dec. 29, 2016

(51) Int. Cl.
G09G 5/00 (2006.01)
G06F 3/01 (2006.01)
G06F 3/0346 (2013.01)
G06K 9/00 (2006.01)

(52) U.S. Cl.
CPC .............. *G06F 3/017* (2013.01); *G06F 3/014* (2013.01); *G06F 3/015* (2013.01); *G06F 3/0346* (2013.01); *G06K 9/00355* (2013.01); *G06K 9/00536* (2013.01)

(58) Field of Classification Search
CPC ..... G06F 2203/0331; G06F 2203/0383; G06F 3/014; G06F 3/017; G06F 3/0233; G06F 3/0346
See application file for complete search history.

(56) References Cited

U.S. PATENT DOCUMENTS

| 7,148,879 | B2 | 12/2006 | Amento et al. | |
|---|---|---|---|---|
| 2003/0091134 | A1 | 5/2003 | Chi et al. | |
| 2007/0064535 | A1 | 3/2007 | Burnstad | |
| 2012/0007713 | A1* | 1/2012 | Nasiri ................... | G06F 1/1694 340/5.81 |
| 2012/0256821 | A1* | 10/2012 | Olsson ................. | G06F 3/0338 345/156 |
| 2012/0306745 | A1* | 12/2012 | Moore ................... | G06F 3/017 345/158 |

(Continued)

FOREIGN PATENT DOCUMENTS

WO    WO2011-094366    8/2011

OTHER PUBLICATIONS

PCT Search Report and Written Opinion, PCT/US2016/017413, 17 pages, dated Jul. 6, 2016.

(Continued)

Primary Examiner — Insa Sadio
(74) Attorney, Agent, or Firm — Womble Bond Dickinson (US) LLP

(57) ABSTRACT

A method is described including receiving real time signals from the sensor array, comparing the real time signals to corresponding training signals representing a gesture from each sensor in the sensor array to determine if a gesture has been recognized and transmitting a command corresponding to a recognized gesture to a remote computing device.

25 Claims, 20 Drawing Sheets

(56) References Cited

U.S. PATENT DOCUMENTS

2014/0176439 A1* 6/2014 Keller .................... G06F 3/014
      345/159

OTHER PUBLICATIONS

Amento, et al., "The Sound of One Hand: A Wrist-mounted Bio-acoustic Fingertip Gesture Interface", Apr. 20-25, 2002 724-725.

* cited by examiner

| Name | Image | Description |
|---|---|---|
| Dual Axis Scroll Up/Down/Right/Left | 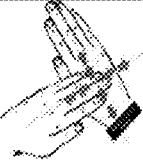 | User drags fingers in two different axis on one of the faces of the hand that is wearing the vibration capture device. |
| Single-Axis Scroll Up/Down |  | User drags thumb in a single axis onto any of the other fingers of the same hand that wears the vibration capture device |
| Flicks (discrete button clicks) |  | User locks any of the four fingers against the thumb and suddenly releases it away from the hand. Alternatively, user locks thumb against index finder and suddenly releases the thumb away from the hand. |
| Pinch In/Out | 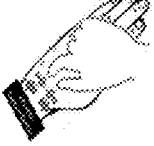 | User performs typical touch-screen pinch gestures on any face (dorsal or palm) of the hand that wears the vibration capture device |
| Single Button Click |  | User taps one or several fingers onto a skin area near the wearable capture device (shown on the dorsal face for illustration). |
| Snap |  | User locks index or middle finger against thumb and suddenly releases it towards the palm. |
| Tap |  | User strikes one or several finger combinations against an object like a table. |

FIG. 8A

| Name | Image | Description |
|---|---|---|
| Clap | 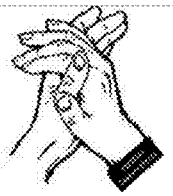 | This is the typical clap gesture. |
| Pull/Push | 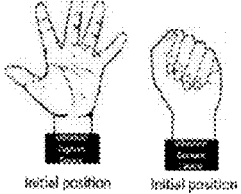 | Starting with the hand extended, the user closes the hand in a sudden, quick movement. The opposite order creates a different recognizable gesture. |
| Waving | 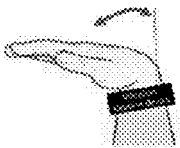 | Starting with the hand extended, in a straight position, aligned with the arm, the user moves the hand to a position that is almost at a right angle from the arm and then goes back to the starting position. |

FIG. 8B

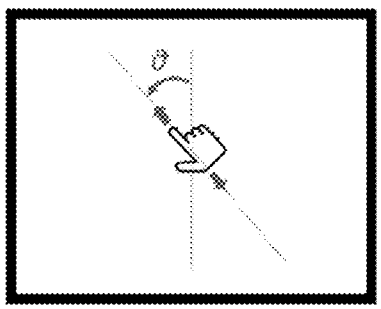

FIG. 13

| Name | Image | Description |
|---|---|---|
| Motion Forward | | User places one/more fingers of the free hand close to the tips of the fingers of the hand with the capture device. From this position, the user moves towards the wrist. |
| Motion Backward | | User places one/more fingers of the free hand close to the wrist of the hand with the capture device. From this position, the user moves towards the finger tips. |

FIG. 14

WEARABLE DEVICE WITH GESTURE RECOGNITION MECHANISM

FIELD

Embodiments described herein generally relate to wearable computing. More particularly, embodiments relate to identifying gestures using a wearable device.

BACKGROUND

Modern clothing and other wearable accessories may incorporate computing or other advanced electronic technologies. Such computing and/or advanced electronic technologies may be incorporated for various functional reasons or may be incorporated for purely aesthetic reasons. Such clothing and other wearable accessories are generally referred to as "wearable technology" or "wearable computing devices."

Wearable devices often include Small Form Factor (SFF) devices, which are becoming prevalent for enabling users to accomplish various tasks while on the go. However, as SFF devices become smaller typical input/output (I/O) interfaces (e.g., keyboard and/or mouse) have become impracticable. Thus, speech or gesture commands may be implemented to interact with SFF computing devices to overcome interface problems. A gesture is defined as any type of movement of part of the body (e.g., a hand, head, facial expression, etc.) to express an idea or meaning.

BRIEF DESCRIPTION OF THE DRAWINGS

Embodiments are illustrated by way of example, and not by way of limitation, in the figures of the accompanying drawings in which like reference numerals refer to similar elements.

FIGS. 8A & 8B illustrates one embodiment of gestures included in a gestures dictionary.

FIG. 13 illustrates one embodiment of 2D pointer motion signals provided by receiving vibration and rotation signals.

FIG. 14 illustrates another embodiment of gestures included in a gestures dictionary.

DETAILED DESCRIPTION

Embodiments may be embodied in systems, apparatuses, and methods for gesture recognition, as described below. In the description, numerous specific details, such as component and system configurations, may be set forth in order to provide a more thorough understanding of the present invention. In other instances, well-known structures, circuits, and the like have not been shown in detail, to avoid unnecessarily obscuring the present invention.

Embodiments provide for a wearable computing device that recognizes gestures based on signals received from various sensors included in the device. According to one embodiment, the sensors capture sound, vibration, rotation and/or optical data. Subsequently a processor compares characteristics of signals received from the sensors to signal characteristics stored for a library of gestures to determine if a gesture has been performed by a user wearing the computing device. If a gesture has been performed, a command corresponding to the gesture is transmitted to a remote host computing device. In embodiment, the wearable computing device may operate as a virtual mouse that enables user control of a user interface operating at the remote host computing device.

Throughout this document, terms like "logic", "component", "module", "framework", "engine", "point", and the like, may be referenced interchangeably and include, by way of example, software, hardware, and/or any combination of software and hardware, such as firmware. Further, any use of a particular brand, word, term, phrase, name, and/or acronym, such as "avatar", "avatar scale factor", "scaling", "animation", "human face", "facial feature points", "zooming-in", "zooming-out", etc., should not be read to limit embodiments to software or devices that carry that label in products or in literature external to this document.

It is contemplated that any number and type of components may be added to and/or removed from the below discussed wearable computing device to facilitate various embodiments including adding, removing, and/or enhancing certain features. For brevity, clarity, and ease of understanding of the wearable computing device, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1:
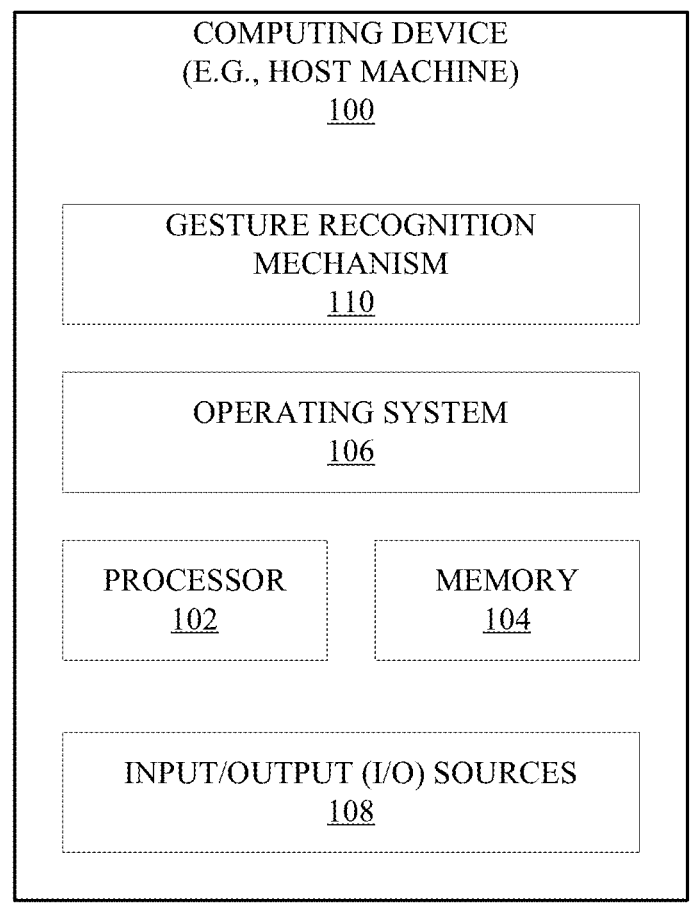
FIG. 1 illustrates a gesture recognition mechanism at a computing device according to one embodiment.

FIG. 1 illustrates a gesture recognition mechanism 110 at a computing device 100 according to one embodiment. In one embodiment, computing device 100 serves as a host machine for hosting gesture recognition mechanism ("recognition mechanism") 110 that includes a combination of any number and type of components for facilitating dynamic identification of gestures at computing devices, such as computing device 100. In one embodiment, computing device 100 includes a wearable device.

Figure 2:
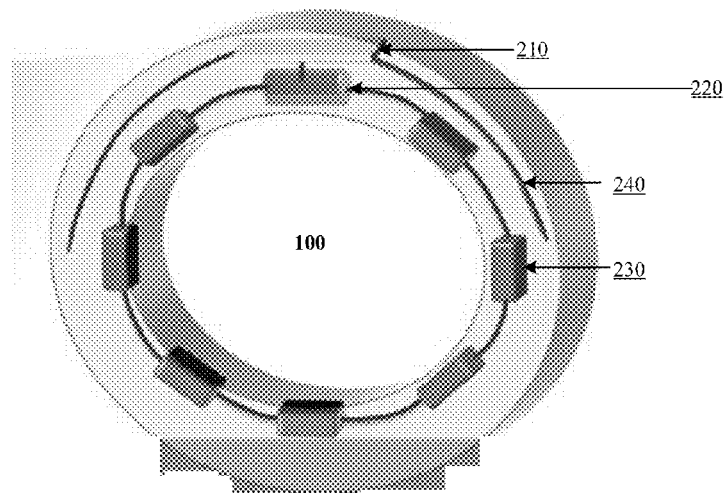
FIG. 2 illustrates one embodiment of a wearable computing device.

FIG. 2 illustrates one embodiment of a computing device 100. In one embodiment, device 100 is a wearable device worn around the wrist of a user. In such an embodiment, computing device 100 is a gesture capture device worn by the user to identify user gestures. In a further embodiment, the gesture capture device 100 may be implemented as a virtual keyboard to provide signals to a host computing device. Device 100 includes processor 210, battery 220, sensors 230 and antenna 240.

Referring back to FIG. 1, computing device 100 may include an operating system (OS) 106 serving as an interface between hardware and/or physical resources of the computer device 100 and a user. Computing device 100 may further include one or more processors 102, memory devices 104, network devices, drivers, or the like, as well as input/output (I/O) sources 108, such as touchscreens, touch panels, touch pads, virtual or regular keyboards, virtual or regular mice, etc.

Figure 4:
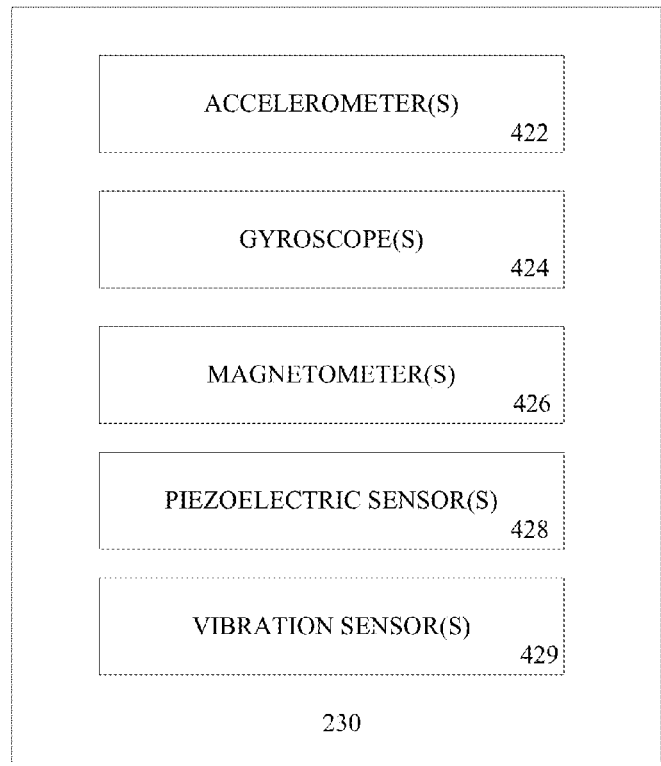
FIG. 4 illustrates one embodiment of sensors.
Figure 3:
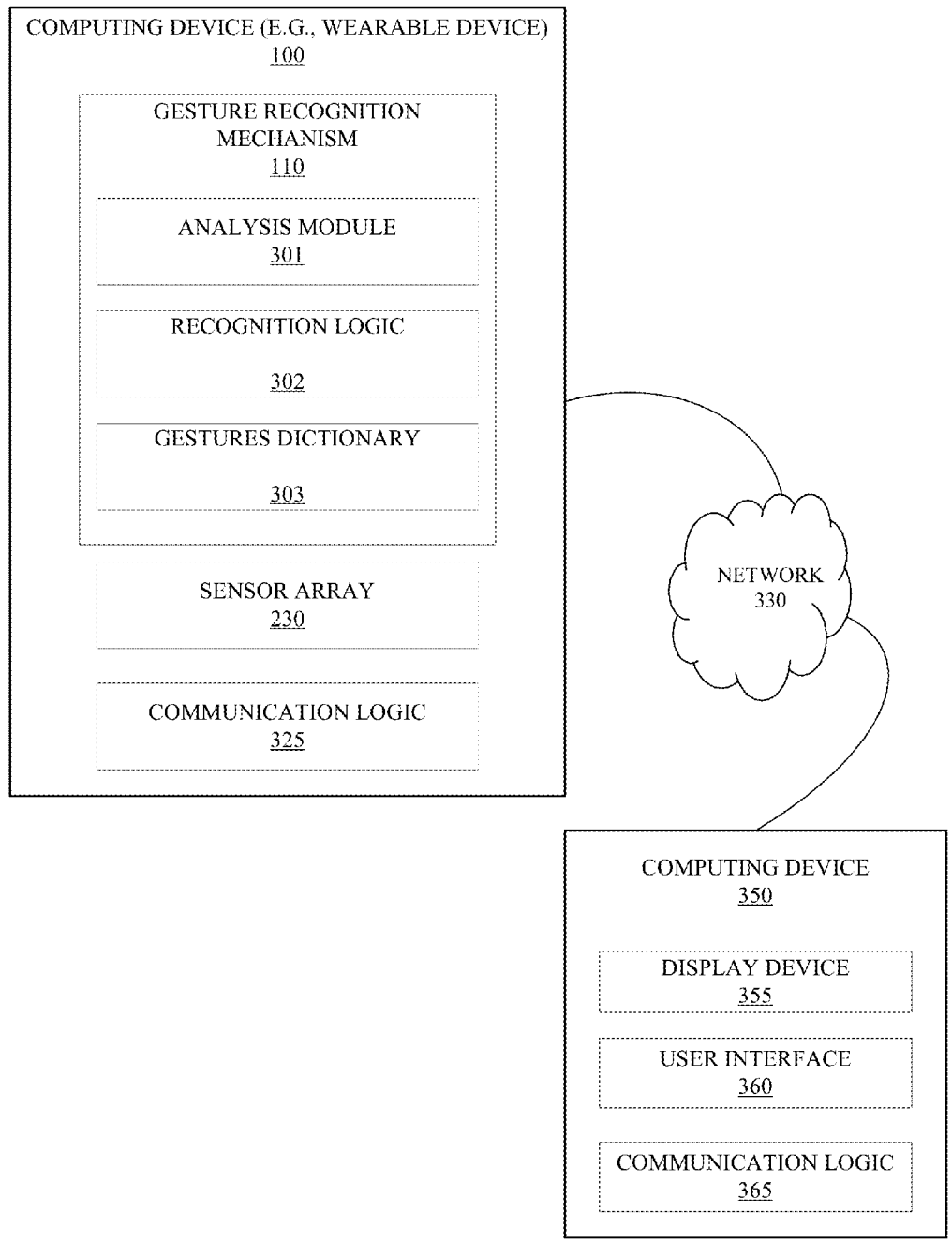
FIG. 3 illustrates one embodiment of a gesture recognition mechanism.

FIG. 3 illustrates an gesture recognition mechanism 110 employed at computing device 100. In one embodiment, gesture recognition mechanism 110 may include any number and type of components, such as: analysis module 301, recognition logic 302 and gestures dictionary 303. In embodiments, gesture recognition mechanism 110 receives input data from sensor array, including sensors 230. FIG. 4 illustrates one embodiment of sensors 230, which include one or more sensors adapted to detect at least one of a vibration, an acceleration, an orientation, or a position of the sensor, or combinations thereof. For example, sensors 230 include one or more accelerometers 422, gyroscopes, 424, magnetometers 426, piezoelectric sensors 428 and vibration sensors 429. According to one embodiment, the sensors are passive piezoelectric sensors (e.g., generate a signal voltage without a supply input).

Referring back to FIG. 3, sensor array 230 may include an image capturing device, such as a camera. Such a device may include various components, such as (but are not limited to) an optics assembly, an image sensor, an image/video encoder, etc., that may be implemented in any combination of hardware and/or software. The optics assembly may include one or more optical devices (e.g., lenses, mirrors, etc.) to project an image within a field of view onto multiple sensor elements within the image sensor. In addition, the optics assembly may include one or more mechanisms to control the arrangement of these optical device(s). For example, such mechanisms may control focusing operations, aperture settings, exposure settings, zooming operations, shutter speed, effective focal length, etc. Embodiments, however, are not limited to these examples.

In a further embodiment, sensor array 230 may include other types of sensing components, such as context-aware sensors (e.g., myoelectric sensors, temperature sensors, facial expression and feature measurement sensors working with one or more cameras, environment sensors (such as to sense background colors, lights, etc.), biometric sensors (such as to detect fingerprints, facial points or features, etc.), and the like.

Figure 5A:
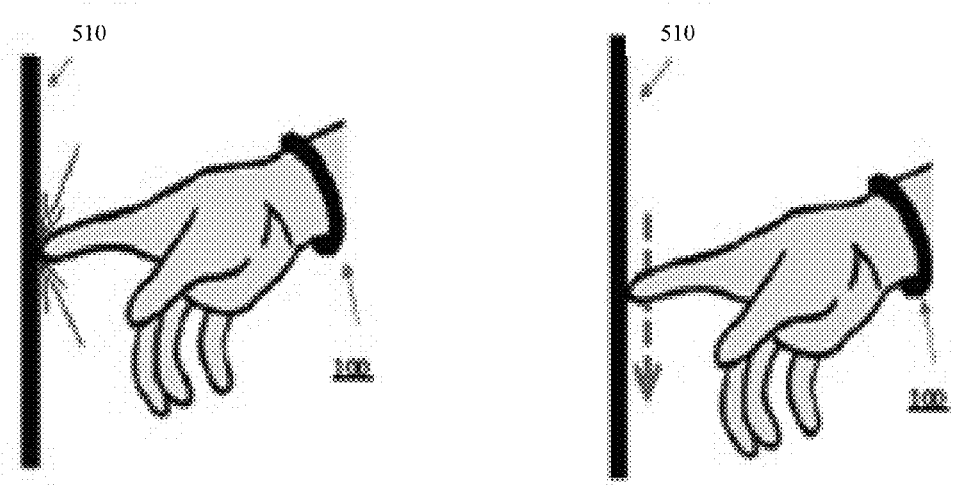
FIG. 5A-5C are schematic illustrations of one embodiment of gestures that may be used with a wearable computing device.
Figure 5B:
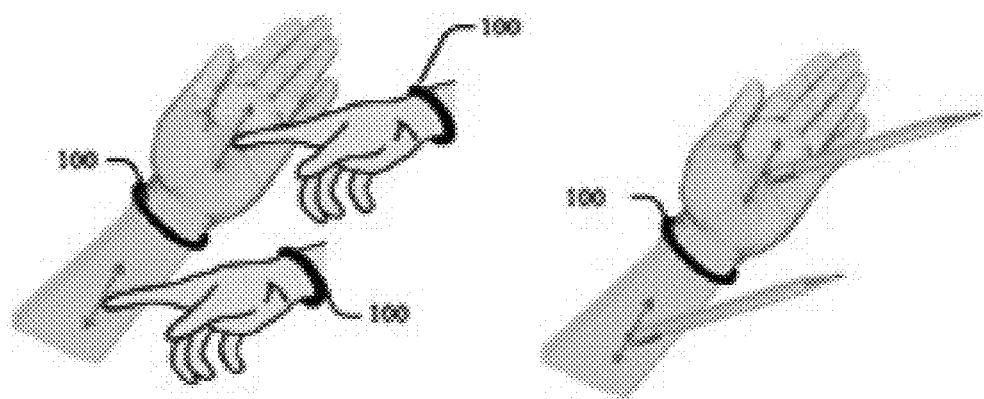
Figure 5C:
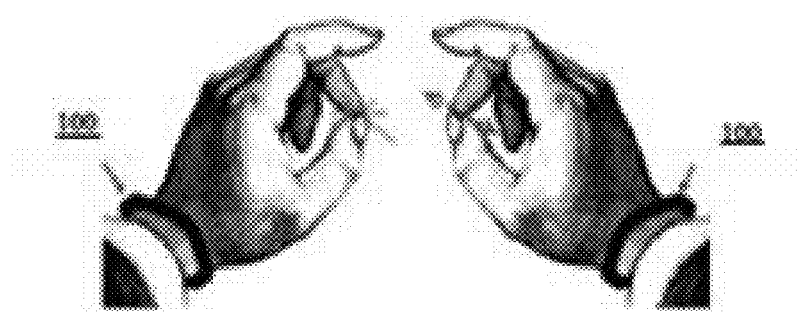
Figure 6:
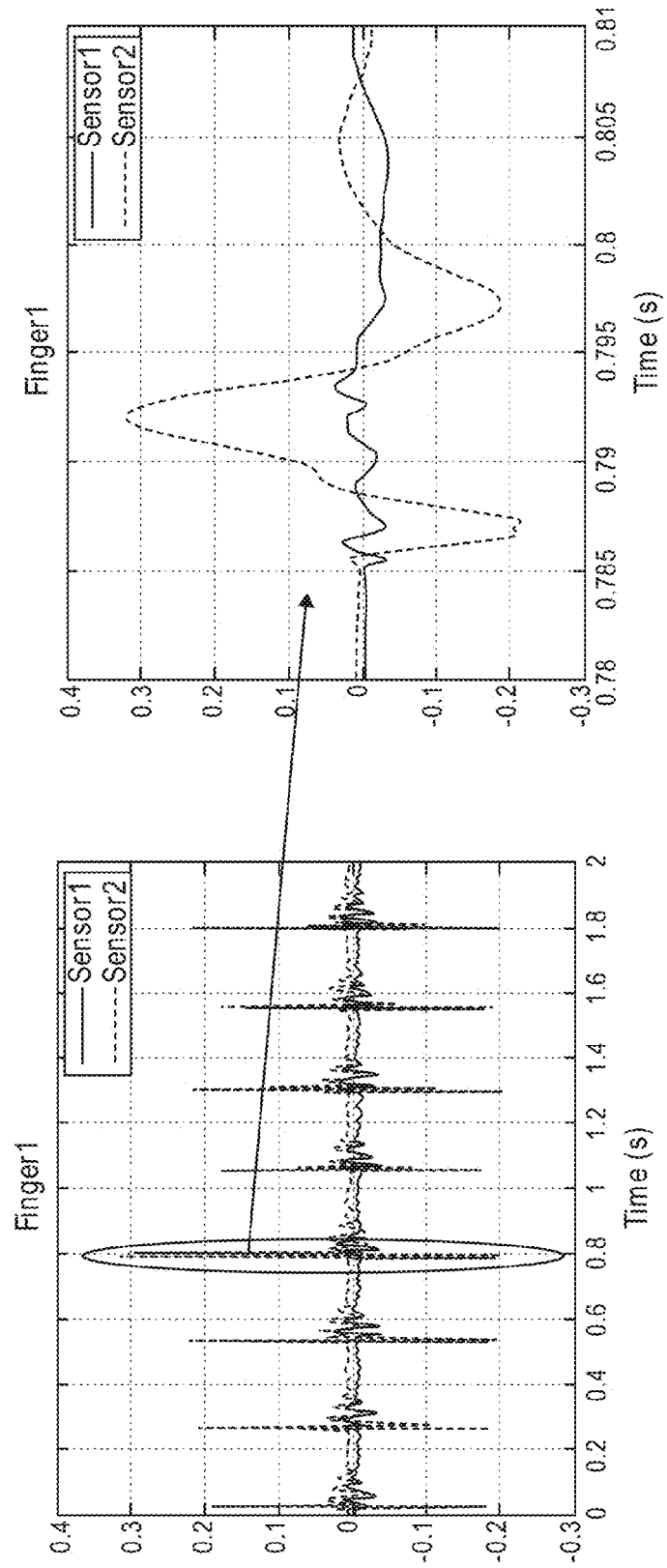
FIG. 6 illustrates one embodiment a series of graphs illustrating response curves from sensors that may be used with a wearable computing device.
Figure 6:
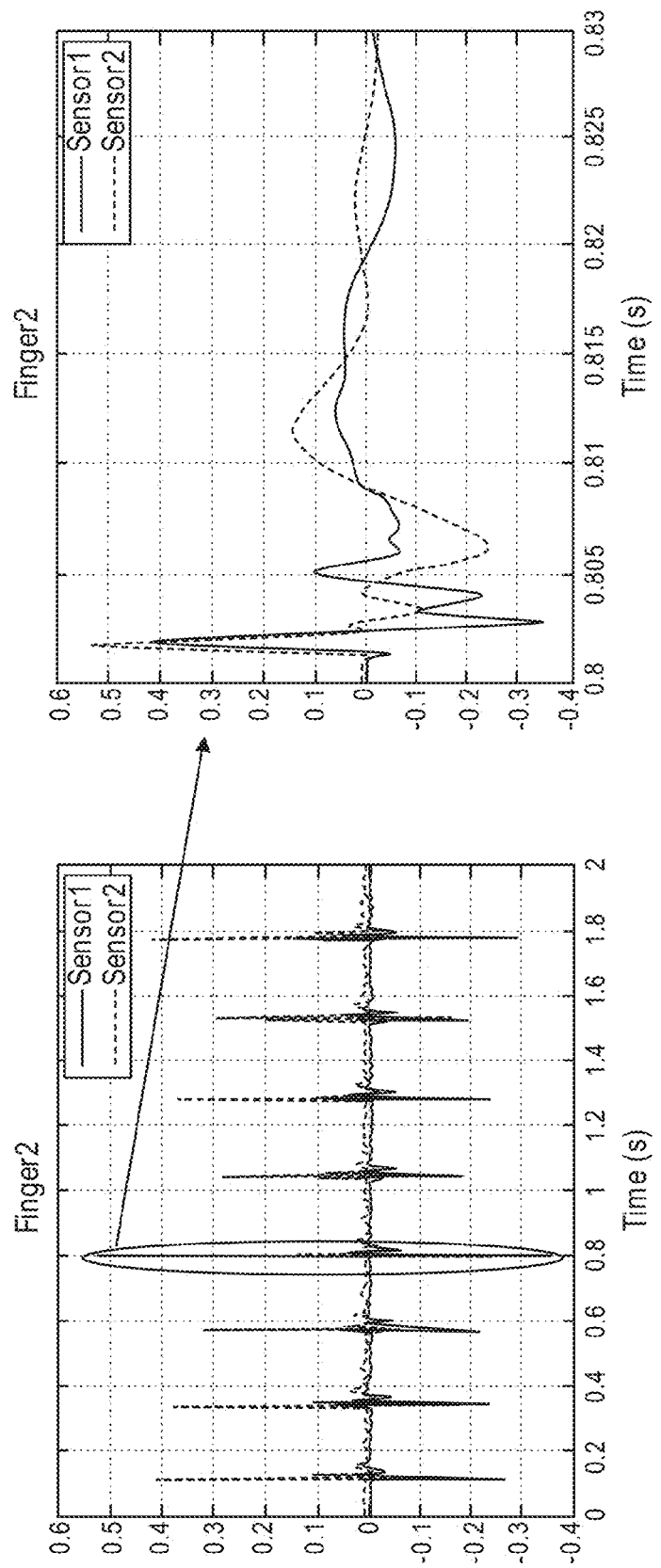
Figure 6:
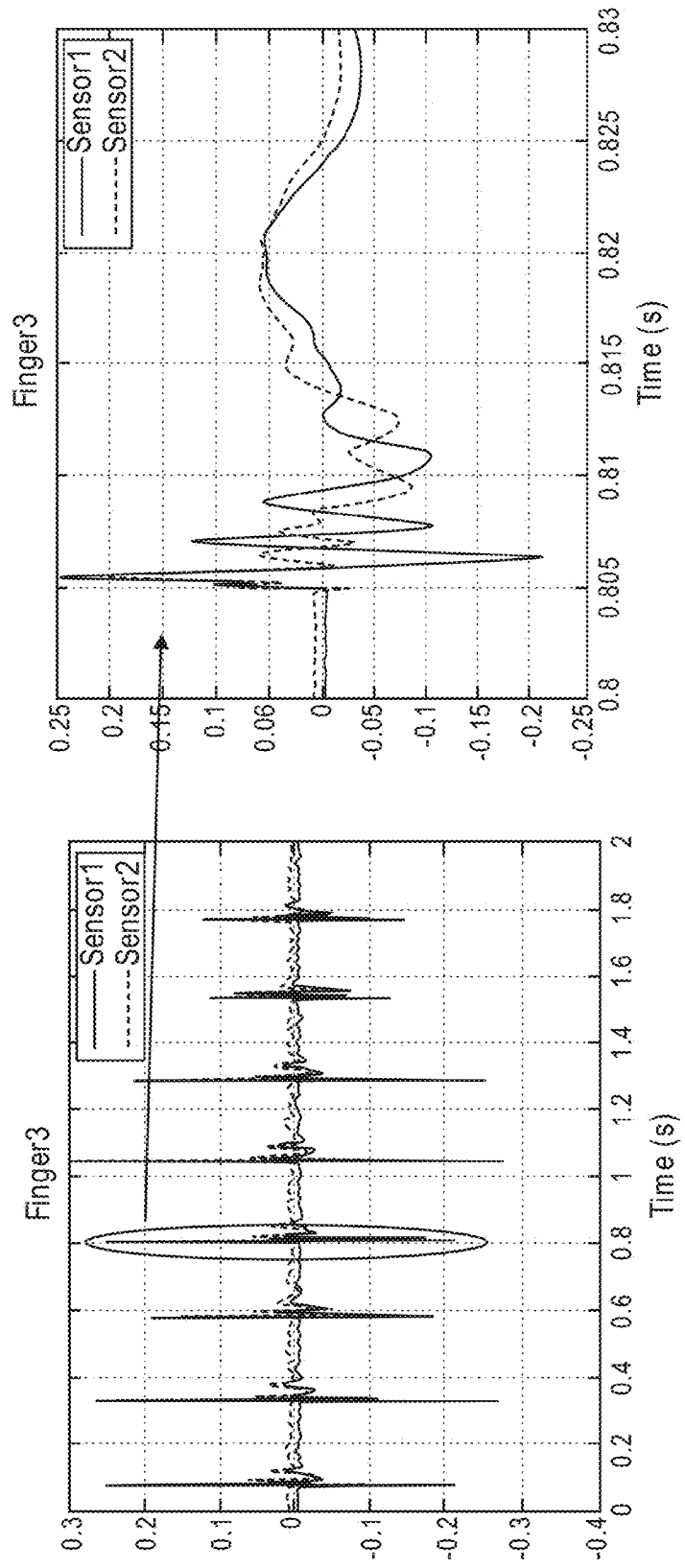
Figure 6:
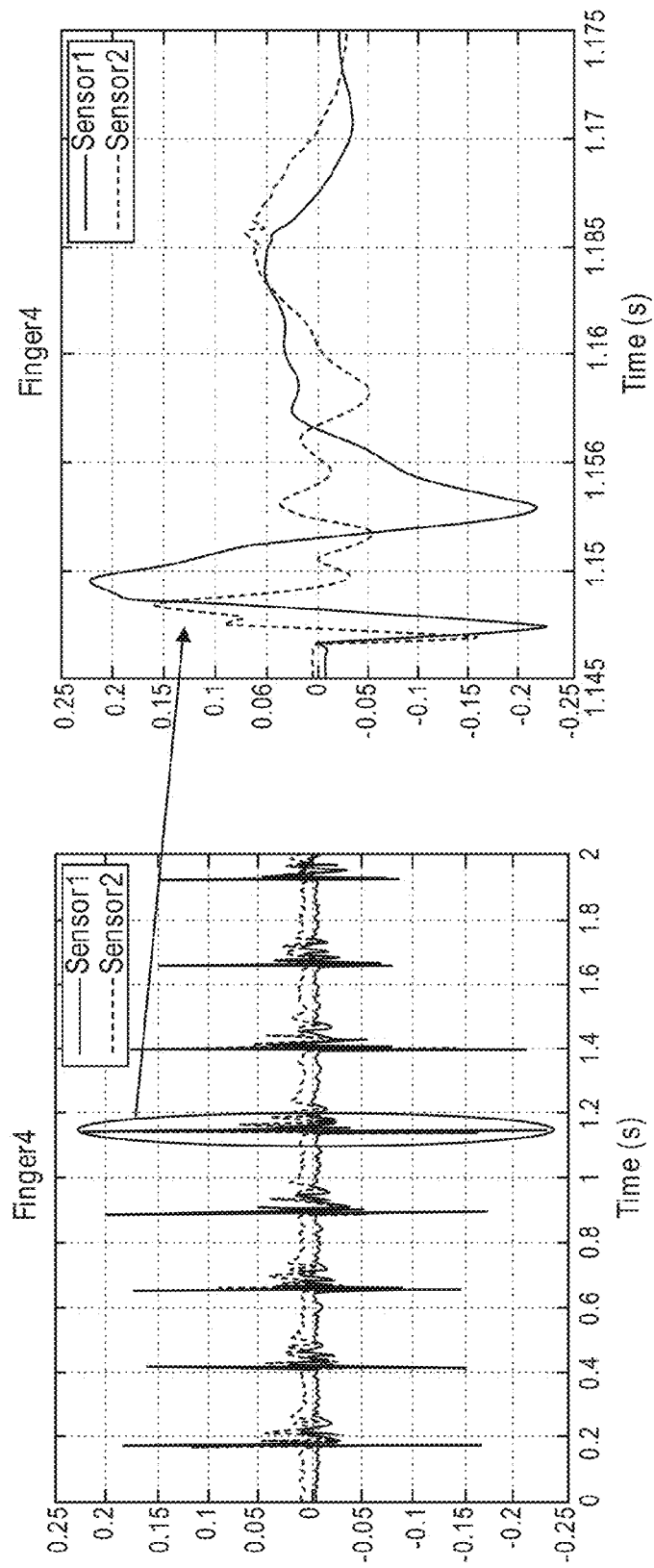
Figure 6:
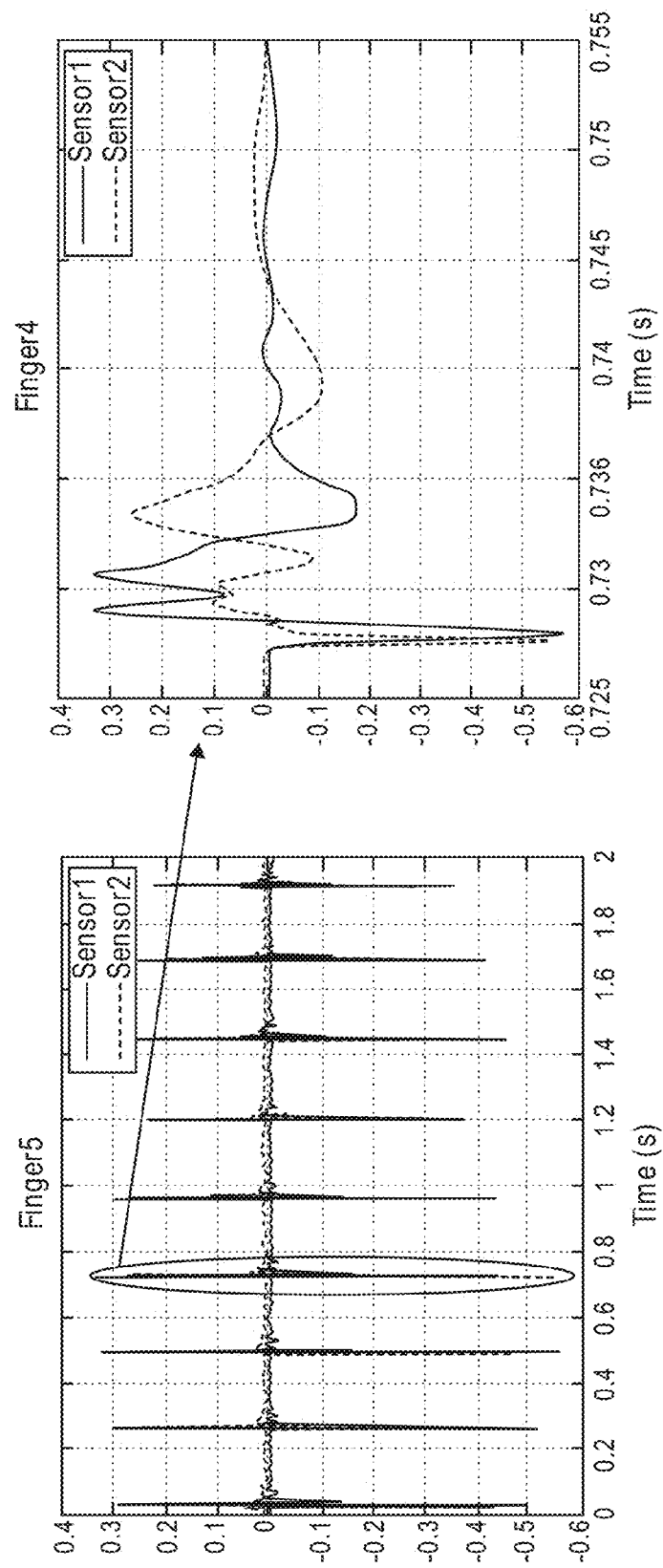

Analysis module 301 processes signals received from sensors 230. According to one embodiment, sensors 230 generate characteristic response curves in response to the various types of contact depicted in FIGS. 5A-5C. For example, FIG. 6 is a series of graphs illustrating one embodiment of response curves from sensors 230 that may be used with computing device 100. The curves denote the output from specific sensors made in response to specific movements by specific fingers of a user. In operation, data from the response curves is stored (e.g., in memory 104) to construct a profile of response curves for a user of a device 100.

Figure 7:
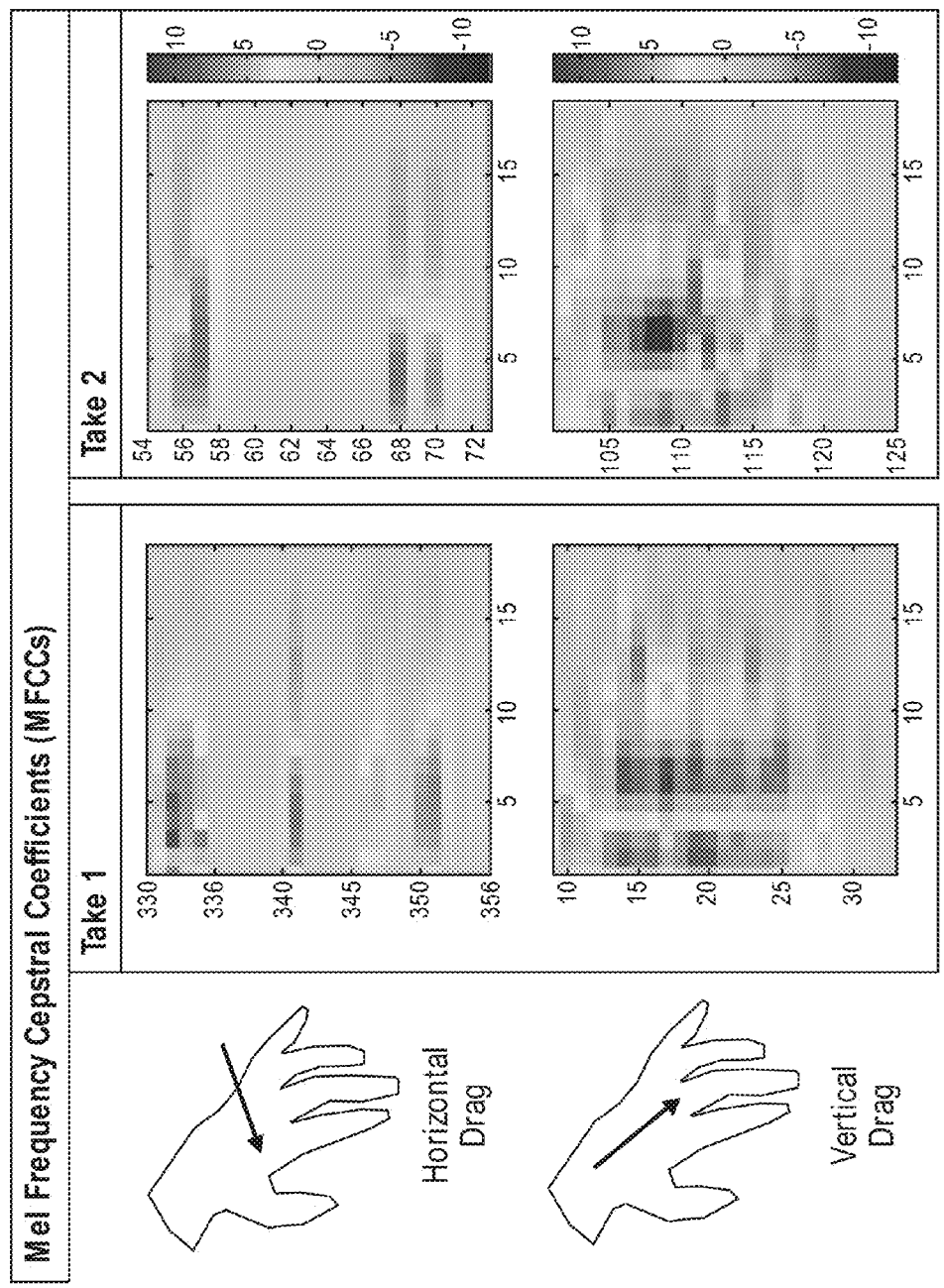
FIG. 7 illustrates one embodiment of a series of graphs illustrating mel-frequency cepstral coefficients of responses from sensors device that may be used with a wearable computing device.
Figure 9:
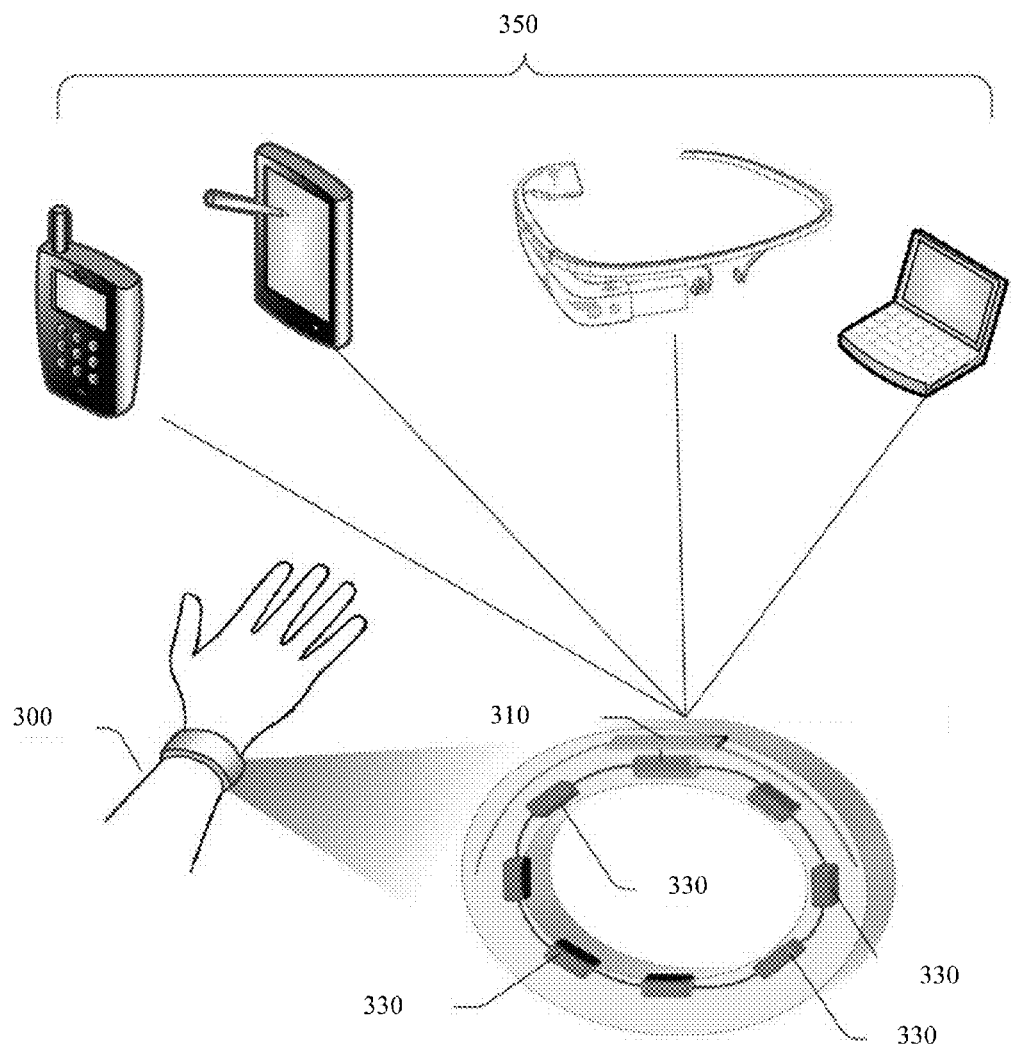
FIG. 9 illustrates one embodiment of a wearable computing device adapted to communicate with other computing devices.

FIG. 7 is a series of graphs illustrating one embodiment of mel-frequency cepstral coefficients of responses from sensors device, which may be used with a device 100. Referring to FIG. 7, acceleration/vibration data from a dragging or a rubbing motion, such as when a user rubs a finger against a surface or rubs an object against a hand or arm, may be processed by analysis module 301 to generate mel-frequency cepstral coefficients (MFCCs) associated with the dragging motion. Data characterizing the mel-frequency cepstral coefficients is stored in memory to construct a profile of response curves for a user of computing device 100. With data representing the various sensor responses to different hand motions, positions, and orientations, gesture recognition may be implemented.

Gestures dictionary 303 provide a definition of specific gestures and corresponding actions (e.g., scroll, pinch, click, etc.). According to one embodiment, gestures library 303 stores training signals representing characteristics for each sensor for a particular gesture. In such an embodiment, a user may undergo a training process in which a user performs each gesture in to be included in gestures library 303, resulting in the training being stored in gestures library 303. FIGS. 8A & 8B illustrates one embodiment of gestures included in gestures dictionary 302. As shown in FIGS. 8A & 8B, each gesture includes a name, image and corresponding description. According to one embodiment, the gestures included gestures dictionary 302 may be displayed to enable a user to train computing device 100. According to one embodiment, analysis module 301 processes characteristics of signals received from sensors 230 during training of each gesture and stores the corresponding characteristics.

Referring back to FIG. 3, recognition logic 302 implements pattern recognition techniques to determine if characteristics of real time signals received from sensors 230 match characteristics of training signals corresponding to gestures in gestures library 303. In one embodiment, recognition logic 302 recognizes scroll, pinch, click, push functions recognized based on mechanical vibration signals propagating through a user's skin/tissue. For instance, vibration sensor 429 detects mechanical vibrations generated that propagate over tissue (e.g., skin, muscles, bones, etc.) during hand/finger motion, and transmits the signals to analysis module 301 for processing. As will be discussed below, other sensor types (e.g., accelerometers (inertial measurement unit (IMU)), optical, electromyographic, radiated ultrasound or radiated electromagnetic means) may be implemented to recognize gesture functions.

Once the signal characteristics have been processed, recognition logic 302 compares the received characteristics with stored characteristics corresponding to gestures to determine if a gesture has been performed. According to one embodiment, recognition logic 302 perform a pattern matching algorithm to determine whether a match has occurred. However, other embodiments may feature different types of matching mechanisms.

Device 100 also includes communication logic 325. Communication logic 325 may be used to facilitate dynamic communication and compatibility between various computing devices, such as computing device 100 and computing devices 350. According to one embodiment, wearable computing device 100 may be in communication with computing device 350 over one or more networks, such as network 330 (e.g., Body Area Network (BAN), cloud network, the Internet, intranet, cellular network, proximity or near proximity networks, etc.).

Computing device 350 may further include display device 355, user interface 360, communication logic 365, and one or more software applications. User interface 360 provides for user interaction with computing device 100 via communication logic 365. In one embodiment, user interface 360 enables a user to interact via gestures from gesture recognition mechanism 110 at computing device 100. Communication logic 365 of computing devices 250 may be similar to or the same as communication logic 325 of computing device 100 and may be used to facilitate communication with gesture recognition mechanism 110 at computing device 100 over network 330. FIG. 8 illustrates one embodiment of a device 100 adapted to communicate with computing devices 350.

It is contemplated that any number and type of components 301-325 of gesture recognition mechanism 110 may not necessarily be at a single computing device and may be allocated among or distributed between any number and type of computing devices, including computing devices 100, 350 having (but are not limited to) server computing devices, cameras, PDAs, mobile phones (e.g., smartphones, tablet computers, etc.), personal computing devices (e.g., desktop devices, laptop computers, etc.), smart televisions, servers, wearable devices, media players, any smart computing devices, and so forth. Further examples include microprocessors, graphics processors or engines, microcontrollers, application specific integrated circuits (ASICs), and so forth. Embodiments, however, are not limited to these examples.

Figure 10:
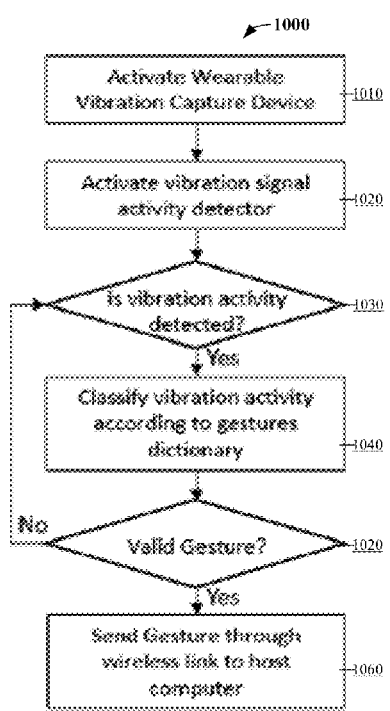
FIG. 10 is a flow diagram illustrating one embodiment of a gesture recognition process implemented at a wearable computing device.

FIG. 10 is a flow diagram illustrating one embodiment of a process 1000 performed by a gesture recognition mechanism. Process 1000 may be performed by processing logic that may comprise hardware (e.g., circuitry, dedicated logic, programmable logic, etc.), software (such as instructions run on a processing device), or a combination thereof. In one embodiment, method 1000 may be performed by gesture recognition mechanism 110. The processes of method 1000 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-9 are not discussed or repeated here.

At processing block 1010, capture device 100 is activated. At processing block 1020, analysis module 301 is activated to detect signals from sensors 230. At decision block 1030, a determination is made as to whether a signal has been detected. If not, control remains at decision block 1030 until a signal is detected. If a signal is detected, analysis module 301 classifies the signal and recognition logic 302 determines whether the classification matches a stored characteristic that corresponds to a gesture included in gestures dictionary 303, processing block 1040. At decision block 1050, recognition logic 302 determines whether a valid gesture has been detected. If so, the gesture is transmitted to a computing device 350 for further processing. Otherwise, control is returned to decision block 1030, where a determination is made as to whether another signal has been detected.

Figure 11:
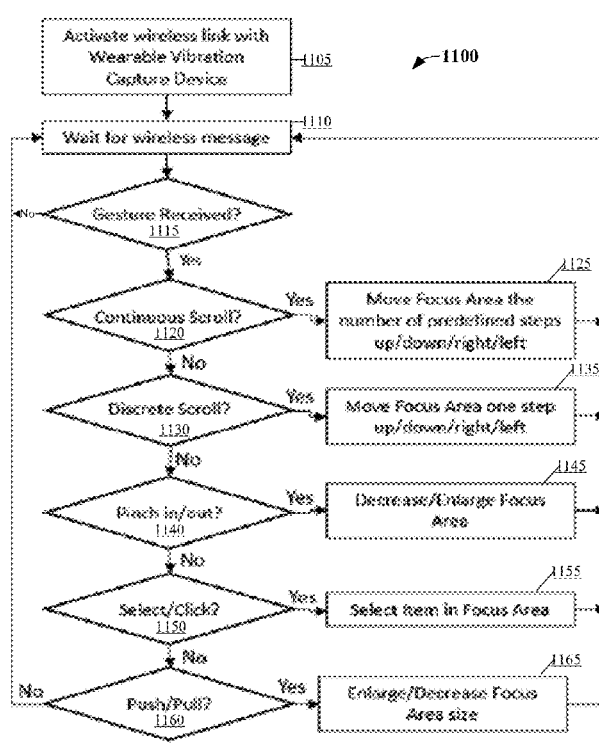
FIG. 11 is a flow diagram illustrating one embodiment of a gesture recognition process implemented at a host.

FIG. 11 is a flow diagram illustrating one embodiment of a process 1100 performed by a computing device 350 upon receiving a gesture. Process 1100 may be performed by processing logic that may comprise hardware (e.g., circuitry, dedicated logic, programmable logic, etc.), software (such as instructions run on a processing device), or a combination thereof. The processes of method 1100 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-10 are not discussed or repeated here.

At processing block 1105, communication logic 365 at a device 350 is activated to receive messages from communication logic 225 at capture device 100. At processing block 1110, device 350 waits for a wireless message from capture device 100. At decision block 1115, a determination is made as to whether a gesture has been received. If not, control remains at decision block 1115 until a gesture is received. If a gesture is received, a determination is made as to whether the gesture is a continuous scroll, decision block 1120.

If the gesture is determined to be a continuous scroll, a focus area is moved a number of predefined steps up, down, right or left, processing block 1125. Otherwise, a determination is made as to whether the gesture is a discrete scroll, decision block 1130. If the gesture is determined to be a discrete scroll, the focus area is moved one step up, down, right or left, processing block 1135. Otherwise, a determination is made as to whether the gesture is a pinch in/out, decision block 1140. If the gesture is determined to be a pinch in/out gesture, the focus area is decreased/enlarged, respectively, processing block 1145.

Figure 12:
FIG. 12 illustrates one embodiment of an application implementing a wearable computing device.

Otherwise, a determination is made as to whether the gesture is a select/click gesture, decision block 1150. If the gesture is determined to be a select/click gesture, an item in the focus area is selected, processing block 1155. Otherwise, a determination is made as to whether the gesture is a push/pull gesture, decision block 1160. If the gesture is determined to be a push/pull gesture, the focus area is enlarged/decreased, respectively, processing block 1165. The above-described processes may be used in various applications. FIG. 12 illustrates an embodiment of an application for selecting a movie in a virtual library. In this application, a user may remotely select a movie by scrolling up/down/right/left in the focus area.

According to one embodiment, at capture device 100 may also be implemented as a two-dimensional (2D) motion pointer. In a further embodiment, capture device 100 uses gestures involving the back (dorsal) or the palm (volar) areas of a hand to implement a 2D touch input user interface. In such an embodiment, gesture recognition mechanism 110 recognizes gestures providing information about direction of rotation and displacement length on a single axis (forward or backward) and transmits a recognized command to a computing device 350 for content control.

According to one embodiment, analysis module 301 simultaneously detects direction of hand rotation from signals received from (accelerometer or IMU) sensors 422 and mechanical vibrations from vibration sensors 429 that travel through the tissue (skin, muscles, bones, etc.) that are generated by touch drags on the hand. As discussed above, gesture recognition logic is implemented to recognize the gestures using pattern recognition techniques Thus, combining accelerometer and vibration signals enables implementation of a 2D movement system.

FIG. 13 illustrates one embodiment of 2D pointer motion signals provided by receiving vibration and rotation signals. As shown in FIG. 13, information is provided regarding direction of rotation and displacement length on a single axis (forward or backward). In this embodiment, gestures dictionary 303 also includes motion forward and backward gestures as shown in FIG. 14.

Figure 15:
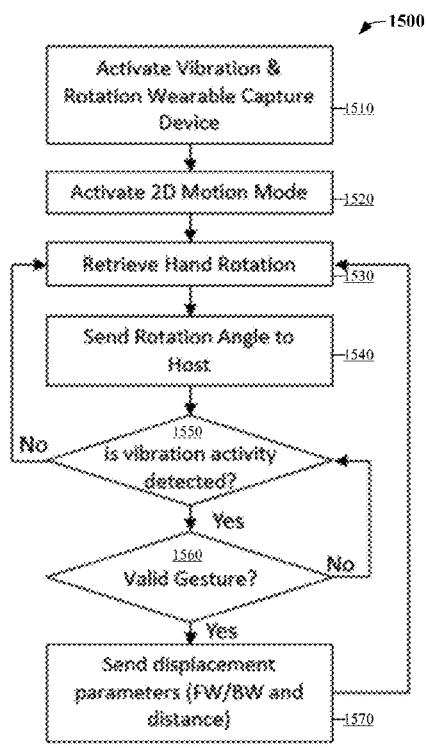
FIG. 15 is a flow diagram illustrating another embodiment of a gesture recognition process implemented at a host.

FIG. 15 is a flow diagram illustrating one embodiment of a process 1500 performed by a gesture recognition mechanism. Process 1500 may be performed by processing logic that may comprise hardware (e.g., circuitry, dedicated logic, programmable logic, etc.), software (such as instructions run on a processing device), or a combination thereof. In one embodiment, method 1500 may be performed by gesture recognition mechanism 110. The processes of method 1500 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-14 are not discussed or repeated here.

At processing block 1510, capture device 100 is activated. At processing block 1520, a 2D motion mode is activated at capture device 100. In such an embodiment, analysis module 301 is activated to detect signals from accelerometer and vibration sensors 230. At processing block 1530, hand rotation is retrieved. At processing block 1540, the rotation angle information is transmitted to a computing device 350. At decision block 1550, a determination is made as to whether vibration signals have been detected. If not, control is returned to processing block 1530 where hand rotation is retrieved. If vibration signals are detected, recognition logic 302 determines whether a valid gesture has been detected, decision block 1560. If so, displacement parameters (e.g., forward, backward and distance) are transmitted to a computing device 350, processing block 1570. Otherwise, control is returned to decision block 1550, where a determination is made as to whether other signals have been detected.

Figure 16:
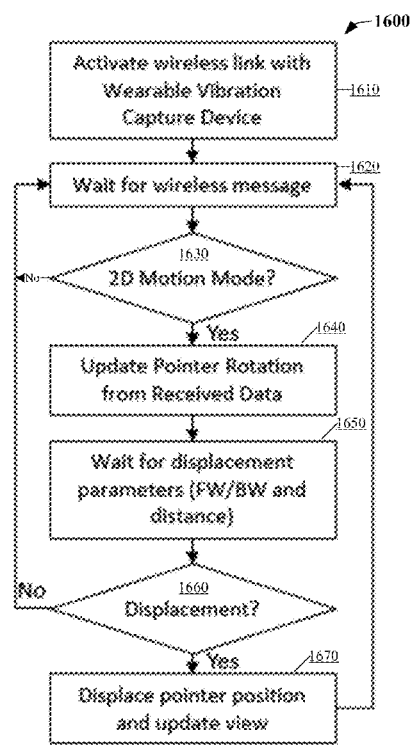
FIG. 16 is a flow diagram illustrating another embodiment of a gesture recognition process implemented at a host.

FIG. 16 is a flow diagram illustrating one embodiment of a process 1600 performed by a computing device 350 upon receiving a gesture. Process 1600 may be performed by processing logic that may comprise hardware (e.g., circuitry, dedicated logic, programmable logic, etc.), software (such as instructions run on a processing device), or a combination thereof. The processes of method 1600 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-15 are not discussed or repeated here.

At processing block 1610, communication logic 365 at a device 350 is activated to receive messages from communication logic 325 at capture device 100. At processing block 1620, device 350 waits for a wireless message from capture device 100. At decision block 1630, a determination is made as to whether 2D motion mode is enabled. If not, control is returned to processing block 1620 to wait for a wireless message. If 2D motion mode is enabled, pointer rotation from received data is updated, processing block 1640. At processing block 1650, device 350 waits for displacement parameters from capture device 100. At decision block 1660, a determination is made as to whether displacement has occurred. If not, control is returned to processing block 1620 to wait for another wireless message. If displacement has occurred, pointer position is displaced and the view is updated, processing block 1670.

Figure 17A:
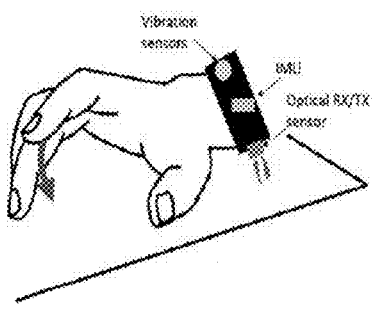
FIGS. 17A & 17B illustrate embodiments of signals of a capture device implementing an optical sensor.
Figure 17B:
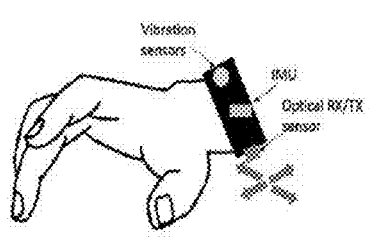

According to a further embodiment, the 2D pointer motion may be implemented using optical signals. In such an embodiment, the optical signals are received in addition to vibration and rotation signals. FIGS. 17A & 17B illustrate embodiments of signals of a capture device implementing an optical sensor to operate as a virtual mouse. As shown in FIGS. 17A & 17B, capture device 100 includes vibration, accelerometer (e.g., IMU) and optical sensors. In such an embodiment, vibration sensors provide gesture vibration signals for click and hold functions, while displacement is realized in by the optical module in FIG. 17A and by the IMU in FIG. 17B.

In FIG. 17A, an optical transceiver in capture device 100 is used to transmit light and the reflection as indication of 2D motion. When the user moves the hand on top of a surface, the light transmitted from the transceiver. In FIG. 17B, the 2D motion is realized with the IMU sensor signals. In this embodiment, no surface is required and the virtual mouse can be used freely in space. The click rest of the mouse functions are implemented by the vibration sensors. In one embodiment, a specific mouse function is activated the user performs any of the gestures illustrated in FIGS. 8A & 8B. Additionally, a hold/release function can be toggled from a single gesture can be implemented.

Figure 18:
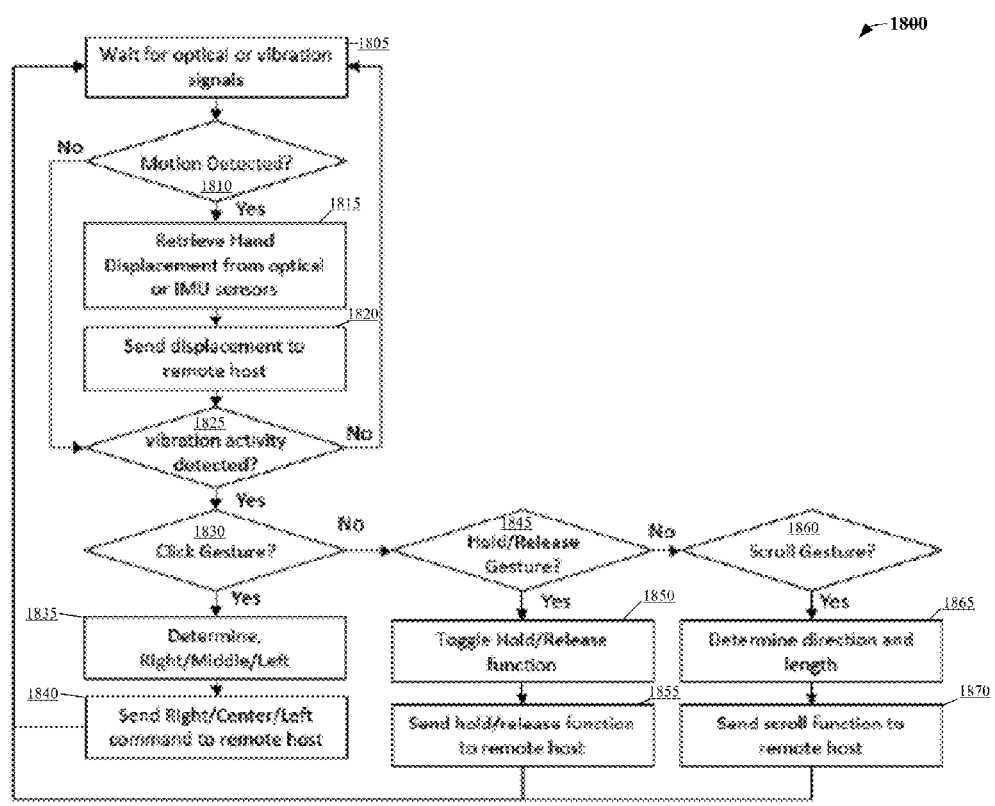
FIG. 18 is a flow diagram illustrating another embodiment of a gesture recognition process implemented at a wearable computing device.

FIG. 18 is a flow diagram illustrating one embodiment of a process 1800 performed by a gesture recognition mechanism. Process 1800 may be performed by processing logic that may comprise hardware (e.g., circuitry, dedicated logic, programmable logic, etc.), software (such as instructions run on a processing device), or a combination thereof. In one embodiment, method 1800 may be performed by gesture recognition mechanism 110. The processes of method 1800 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-17 are not discussed or repeated here.

At processing block 1805, capture device 100 waits for optical or vibration signals. At decision block 1810, a determination is made as to whether motion is detected. If motion is detected, hand displacement is received from optical or IMU sensors, processing block 1815. At processing block 1820, the displacement is forwarded to computing device 350. Subsequently, or if no motion is detected at decision block 1810, a determination is made as to whether vibration signals are detected, decision block 1825. If not, control returns to decision block 1805 until signals are detected.

If vibration signals are detected, recognition logic 302 determines whether a click gesture has been detected, decision block 1830. If so, it is determined whether the click gesture is a right, middle or left click gesture, processing block 1835. At processing block 1840, a corresponding command (e.g., right, middle or left) is forwarded to computing device 350. Subsequently control is returned to processing block 1805 to wait for further signals.

If at decision block 1830 it is determined that a click gesture has not been detected, it is determined whether a hold release gesture has been detected, decision block 1845. If so, a toggle hold/release function is performed, processing block 1850. At processing block 1860, a toggle hold/release function command is forwarded to computing device 350. Subsequently control is returned to processing block 1805 to wait for further signals.

If at decision block 1845 it is determined that a hold/release gesture has not been detected, it is determined whether a scroll release gesture has been detected, decision block 1860. If so, the direction and length of the gesture is determined, processing block 1865. At processing block 1870, a scroll function command is forwarded to computing device 350. Subsequently control is returned to processing block 1805 to wait for further signals.

Figure 19:
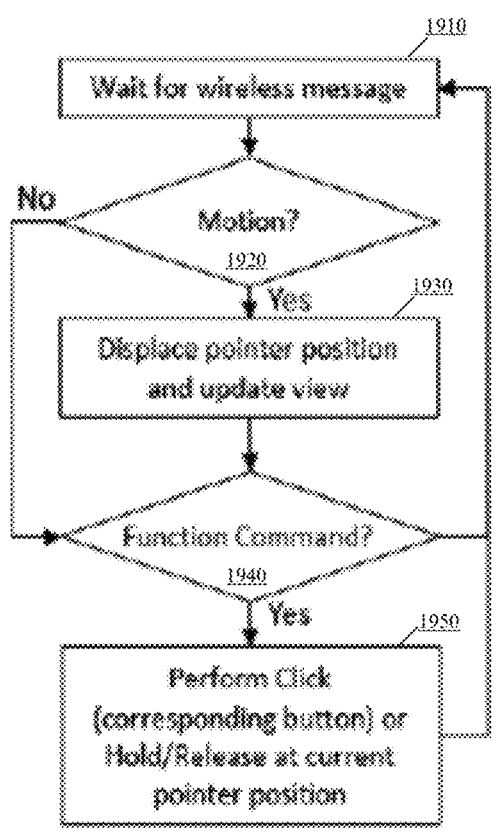
FIG. 19 is a flow diagram illustrating another embodiment of a gesture recognition process implemented at a host.

FIG. 19 is a flow diagram illustrating one embodiment of a process 1900 performed by a computing device 350 upon receiving a gesture. Process 1900 may be performed by processing logic that may comprise hardware (e.g., circuitry, dedicated logic, programmable logic, etc.), software (such as instructions run on a processing device), or a combination thereof. The processes of method 1900 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-18 are not discussed or repeated here.

At processing block 1910, device 350 waits for a wireless message from capture device 100. At decision block 1920, a determination is made as to whether 2D motion has been detected. If so, the pointer position is displaced and the view is updated, processing block 1930. Subsequently, or if no motion is detected at decision block 1920, a determination is made as to whether a function command has been detected, decision block 1940. If a function command is detected, a click or hold/release function is performed at the current position. If no function command is detected, control is returned to processing block 1910 to wait for a wireless message.

Figure 20:
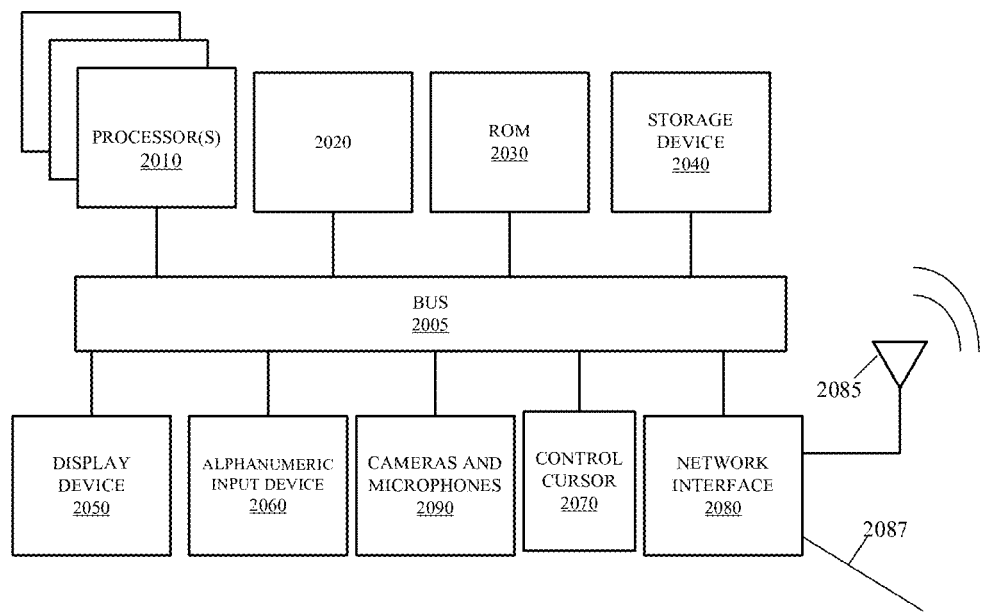
FIG. 20 illustrates one embodiment of a computer system.

FIG. 20 illustrates one embodiment of a computer system 2000, which may be representative of computing device 100 and computing device 350. Computing system 2000 includes bus 2005 (or, for example, a link, an interconnect, or another type of communication device or interface to communicate information) and processor 2010 coupled to bus 2005 that may process information. While computing system 2000 is illustrated with a single processor, electronic system 2000 and may include multiple processors and/or co-processors, such as one or more of central processors, graphics processors, and physics processors, etc. Computing system 2000 may further include random access memory (RAM) or other dynamic storage device 2020 (referred to as main memory), coupled to bus 2005 and may store information and instructions that may be executed by processor 2010. Main memory 2020 may also be used to store temporary variables or other intermediate information during execution of instructions by processor 2010.

Computing system 2000 may also include read only memory (ROM) and/or other storage device 2030 coupled to bus 2005 that may store static information and instructions for processor 2010. Date storage device 2040 may be coupled to bus 2005 to store information and instructions. Date storage device 2040, such as magnetic disk or optical disc and corresponding drive may be coupled to computing system 2000.

Computing system 2000 may also be coupled via bus 2005 to display device 2050, such as a cathode ray tube (CRT), liquid crystal display (LCD) or Organic Light Emitting Diode (OLED) array, to display information to a user. User input device 2060, including alphanumeric and other keys, may be coupled to bus 2005 to communicate information and command selections to processor 2010. Another type of user input device 2060 is cursor control 2070, such as a mouse, a trackball, a touchscreen, a touchpad, or cursor direction keys to communicate direction information and command selections to processor 2010 and to control cursor movement on display 2050. Camera and microphone arrays 2090 of computer system 2000 may be coupled to bus 2005 to observe gestures, record audio and video and to receive and transmit visual and audio commands.

Computing system 2000 may further include network interface(s) 2080 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 2080 may include, for example, a wireless network interface having antenna 2085, which may represent one or more antenna(e). Network interface(s) 2080 may also include, for example, a wired network interface to communicate with remote devices via network cable 2087, which may be, for example, an Ethernet cable, a coaxial cable, a fiber optic cable, a serial cable, or a parallel cable.

Network interface(s) 2080 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 2080 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 2080 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 2000 may vary from implementation to implementation depending upon numerous factors, such as price constraints, performance requirements, technological improvements, or other circumstances. Examples of the electronic device or computer system 2000 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate gesture recognition, comprising a sensor array to acquire sensory data, a gestures library to store training signals representing a gesture from each sensor in the sensor array, gesture recognition logic to receive real time signals from the sensor array and to compare the real time signals to corresponding training signals within the library to determine if a gesture has been recognized and communication logic to transmit a command corresponding to a recognized gesture to a remote computing device.

Example 2 includes the subject matter of Example 1, further comprising an analysis module to process characteristics of the training signals and the real time signals Example 3 includes the subject matter of Example 2, wherein the recognition logic performs a pattern recognition technique to determine if characteristics of real time signals match characteristics of training signals corresponding to gestures in the gestures library.

Example 4 includes the subject matter of Example 3, wherein the recognition logic performs a pattern recognition technique to determine if characteristics of real time signals match characteristics of training signals corresponding to gestures in the gestures library.

Example 5 includes the subject matter of Example 4, wherein the gesture recognition logic recognizes a gesture based on mechanical vibration signals from the vibration sensors.

Example 6 includes the subject matter of Example 4, wherein the gestures library comprises at least one of scroll, pinch, click and push gestures.

Example 7 includes the subject matter of Example 3, wherein the sensory array comprises one or more vibration sensors to detect mechanical vibrations generated that propagate over tissue during movement and one or more accelerometer sensors to detect a direction of rotation.

Example 8 includes the subject matter of Example 7, wherein the gesture recognition logic recognizes two-dimensional (2D) motion gestures based on mechanical vibration signals from the vibration sensors and direction of rotation signals from the accelerometer sensors.

Example 9 includes the subject matter of Example 8, wherein the mechanical vibration signals and direction of rotation signals provide real-time signals regarding direction of rotation and displacement length on a single axis.

Example 10 includes the subject matter of Example 9, wherein the gestures library comprises at least one of motion forward and motion backward gestures.

Example 11 includes the subject matter of Example 3, wherein the sensory array comprises one or more vibration sensors to detect mechanical vibrations generated that propagate over tissue during movement, one or more accelerometer sensors to detect a direction of rotation and an optical transceiver to detect light reflectance.

Example 12 includes the subject matter of Example 11, wherein the gesture recognition logic recognizes two-dimensional (2D) motion gestures based on mechanical vibration signals from the vibration sensors, direction of rotation signals from the accelerometer sensors and light reflectance signals from the optical transceiver.

Example 13 includes the subject matter of Example 12, wherein the mechanical vibration signals, direction of rotation signals and reflectance signals provide real-time signals regarding direction of rotation and displacement length on a single axis.

Some embodiments pertain to Example 14 that includes a method to facilitate gesture recognition, comprising receiving real time signals from the sensor array, comparing the real time signals to corresponding training signals representing a gesture from each sensor in the sensor array to determine if a gesture has been recognized and transmitting a command corresponding to a recognized gesture to a remote computing device.

Example 15 includes the subject matter of Example 14, wherein receiving real time signals from the sensor array comprises receiving mechanical vibration signals from one or more vibration sensors.

Example 16 includes the subject matter of Example 15, further comprising determining from the mechanical vibration signals whether the gesture has been recognized.

Example 17 includes the subject matter of Example 15, further comprising the remote computing device receiving the command, determining the gesture that is to be performed and performing an action corresponding to gesture indicated by command.

Example 18 includes the subject matter of Example 14, wherein receiving real time signals from the sensor array comprises receiving direction of rotation signals from one or more accelerometer sensors and receiving mechanical vibration signals from one or more vibration sensors.

Example 19 includes the subject matter of Example 18, further comprising determining from the mechanical vibration signals and the direction of rotation signals whether the gesture has been recognized, transmitting a command corresponding to a recognized gesture to the remote computing device, transmitting a rotation angle to the remote computing device and transmitting displacement parameters to the remote computing device.

Example 20 includes the subject matter of Example 14, wherein receiving real time signals from the sensor array comprises receiving light reflectance signals from an optical transceiver and receiving mechanical vibration signals from one or more vibration sensors.

Example 21 includes the subject matter of Example 20, further comprising determining from the mechanical vibration signals and light reflectance signals the whether the gesture has been recognized, transmitting a command corresponding to a recognized gesture to the remote computing device and transmitting displacement parameters to the remote computing device.

Some embodiments pertain to Example 22 that includes at least one machine-readable medium comprising a plurality of instructions that in response to being executed on a computing device, causes the computing device to carry out operations comprising receiving real time signals from the sensor array, comparing the real time signals to corresponding training signals representing a gesture from each sensor in the sensor array to determine if a gesture has been recognized and transmitting a command corresponding to a recognized gesture to a remote computing device.

Example 23 includes the subject matter of Example 22, wherein receiving real time signals from the sensor array comprises receiving mechanical vibration signals from one or more vibration sensors.

Example 24 includes the subject matter of Example 23, further comprising determining from the mechanical vibration signals whether the gesture has been recognized.

Example 25 includes the subject matter of Example 24, comprising a plurality of instructions that in response to being executed on a computing device, causes the computing device to further carry out operations comprising the remote computing device receiving the command, determining the gesture that is to be performed and performing an action corresponding to gesture indicated by command.

Some embodiments pertain to Example 26 that includes at least one machine-readable medium comprising a plurality of instructions that in response to being executed on a computing device, causes the computing device to carry out operations according to any of claims 14-21.

Some embodiments pertain to Example 27 that includes an apparatus to facilitate gesture recognition, comprising means for receiving real time signals from the sensor array, means for comparing the real time signals to corresponding training signals representing a gesture from each sensor in the sensor array to determine if a gesture has been recognized and means for transmitting a command corresponding to a recognized gesture to a remote computing device.

Example 28 includes the subject matter of Example 27, wherein the means for receiving real time signals from the sensor array comprises means for receiving mechanical vibration signals from one or more vibration sensors.

Example 29 includes the subject matter of Example 28, further comprising means for determining from the mechanical vibration signals whether the gesture has been recognized.

Example 30 includes the subject matter of Example 28, further comprising means for the remote computing device receiving the command, means for determining the gesture that is to be performed and means for performing an action corresponding to gesture indicated by command.

Example 31 includes the subject matter of Example 27, wherein the means for receiving real time signals from the sensor array comprises means for receiving direction of rotation signals from one or more accelerometer sensors and means for receiving mechanical vibration signals from one or more vibration sensors.

Example 32 includes the subject matter of Example 31, further comprising means for determining from the mechanical vibration signals and the direction of rotation signals whether the gesture has been recognized, means for transmitting a command corresponding to a recognized gesture to the remote computing device, means for transmitting a rotation angle to the remote computing device and means for transmitting displacement parameters to the remote computing device.

Example 33 includes the subject matter of Example 27, wherein the means for receiving real time signals from the sensor array comprises means for receiving light reflectance signals from an optical transceiver and means for receiving mechanical vibration signals from one or more vibration sensors.

Example 34 includes the subject matter of Example 33, means for determining from the mechanical vibration signals and light reflectance signals the whether the gesture has been recognized, means for transmitting a command corresponding to a recognized gesture to the remote computing device and means for transmitting displacement parameters to the remote computing device.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus to facilitate gesture recognition, comprising:
a sensor array to acquire sensory data and to generate characteristic response curves representing output of each sensor in the sensor array in response to a movement, wherein data characterizing mel-frequency cepstral coefficients is stored in a memory to generate the characteristic response curves for a user;
a gestures library to store training signals representing a gesture from each sensor in the sensor array;
gesture recognition logic to receive real time signals from the sensor array and to compare the real time signals to corresponding training signals within the library to determine if a gesture has been recognized; and
communication logic to transmit a command corresponding to a recognized gesture to a remote computing device.

2. The apparatus of claim 1, further comprising an analysis module comprising at least one processor to process characteristics of the training signals and the real time signals.

3. The apparatus of claim 2, wherein the recognition logic performs a pattern recognition technique to determine if characteristics of real time signals match characteristics of training signals corresponding to gestures in the gestures library.

4. The apparatus of claim 3, wherein the sensory array comprises one or more vibration sensors to detect mechanical vibrations generated that propagate over tissue during movement.

5. The apparatus of claim 4, wherein the gesture recognition logic recognizes a gesture based on mechanical vibration signals from the vibration sensors.

6. The apparatus of claim 4, wherein the gestures library comprises at least one of scroll, pinch, click and push gestures.

7. The apparatus of claim 3, wherein the sensory array comprises:
one or more vibration sensors to detect mechanical vibrations generated that propagate over tissue during movement; and
one or more accelerometer sensors to detect a direction of rotation.

8. The apparatus of claim 7, wherein the gesture recognition logic recognizes two-dimensional (2D) motion gestures based on mechanical vibration signals from the vibration sensors and direction of rotation signals from the accelerometer sensors.

9. The apparatus of claim 8, wherein the mechanical vibration signals and direction of rotation signals provide real-time signals regarding direction of rotation and displacement length on a single axis.

10. The apparatus of claim 9, wherein the gestures library comprises at least one of motion forward and motion backward gestures.

11. The apparatus of claim 3, wherein the sensory array comprises:
one or more vibration sensors to detect mechanical vibrations generated that propagate over tissue during movement;
one or more accelerometer sensors to detect a direction of rotation; and
an optical transceiver to detect light reflectance.

12. The apparatus of claim 11, wherein the gesture recognition logic recognizes two-dimensional (2D) motion gestures based on mechanical vibration signals from the vibration sensors, direction of rotation signals from the accelerometer sensors and light reflectance signals from the optical transceiver.

13. The apparatus of claim 12, wherein the mechanical vibration signals, direction of rotation signals and reflectance signals provide real-time signals regarding direction of rotation and displacement length on a single axis.

14. A method to facilitate gesture recognition, comprising:
receiving real time signals from a sensor array;
generating characteristic response curves representing output of each sensor in the sensor array in response to a movement, wherein data characterizing mel-frequency cepstral coefficients is stored in a memory to generate the characteristic response curves for a user;
comparing the real time signals to corresponding training signals representing a gesture from each sensor in the sensor array to determine if a gesture has been recognized; and
transmitting a command corresponding to a recognized gesture to a remote computing device.

15. The method of claim 14, wherein receiving real time signals from the sensor array comprises receiving mechanical vibration signals from one or more vibration sensors.

16. The method of claim 15, further comprising determining from the mechanical vibration signals whether the gesture has been recognized.

17. The method of claim 15, further comprising:
the remote computing device receiving the command;
determining the gesture that is to be performed; and
performing an action corresponding to gesture indicated by command.

18. The method of claim 14, wherein receiving real time signals from the sensor array comprises:
receiving direction of rotation signals from one or more accelerometer sensors; and
receiving mechanical vibration signals from one or more vibration sensors.

19. The method of claim 18, further comprising:
determining from the mechanical vibration signals and the direction of rotation signals whether the gesture has been recognized;
transmitting a command corresponding to a recognized gesture to the remote computing device;
transmitting a rotation angle to the remote computing device; and
transmitting displacement parameters to the remote computing device.

20. The method of claim 14, wherein receiving real time signals from the sensor array comprises:
receiving light reflectance signals from an optical transceiver; and
receiving mechanical vibration signals from one or more vibration sensors.

21. The method of claim 20, further comprising:
determining from the mechanical vibration signals and light reflectance signals the whether the gesture has been recognized;
transmitting a command corresponding to a recognized gesture to the remote computing device; and
transmitting displacement parameters to the remote computing device.

22. At least one non-transitory machine-readable medium comprising a plurality of instructions that in response to being executed on a computing device, causes the computing device to carry out operations comprising:

receiving real time signals from a sensor array;

generating characteristic response curves representing output of each sensor in the sensor array in response to a movement, wherein data characterizing mel-frequency cepstral coefficients is stored in a memory to generate the characteristic response curves for a user;

comparing the real time signals to corresponding training signals representing a gesture from each sensor in the sensor array to determine if a gesture has been recognized; and transmitting a command corresponding to a recognized gesture to a remote computing device.

23. The at least one non-transitory machine-readable medium of claim 22, wherein receiving real time signals from the sensor array comprises receiving mechanical vibration signals from one or more vibration sensors.

24. The at least one non-transitory machine-readable medium of claim 23, further comprising determining from the mechanical vibration signals whether the gesture has been recognized.

25. The at least one non-transitory machine-readable medium of claim 24, comprising a plurality of instructions that in response to being executed on a computing device, causes the computing device to further carry out operations comprising:

the remote computing device receiving the command;

determining the gesture that is to be performed; and performing an action corresponding to gesture indicated by command.

* * * * *